Feb. 16, 1926.
J. YANOVICH ET AL
1,573,471
SAFETY FENDER FOR MOTOR VEHICLES
Filed August 11, 1925  6 Sheets-Sheet 3
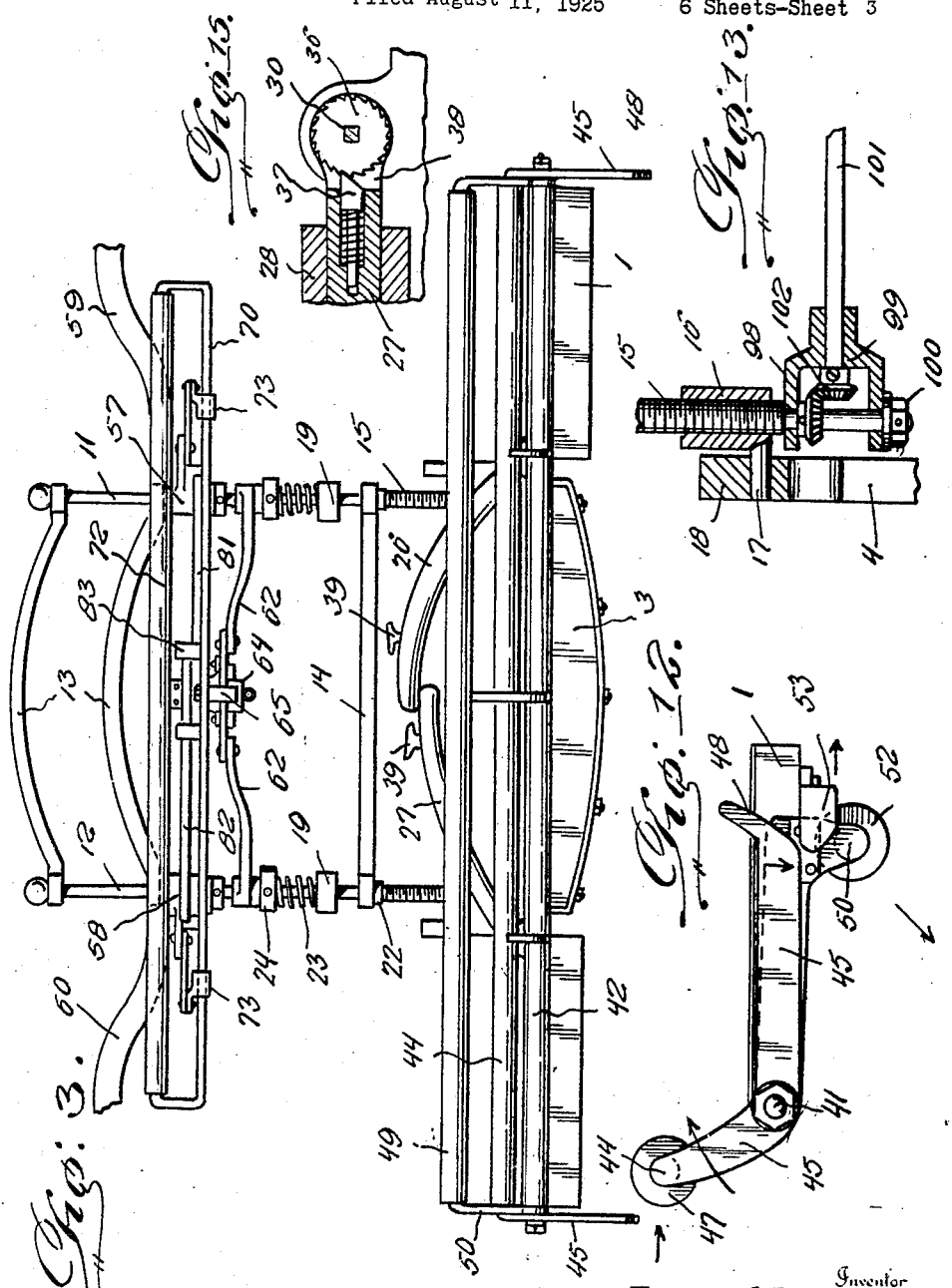
Inventor
John Yanovich,
Joseph Hrusecky.
By Clarence A. O'Brien
Attorney

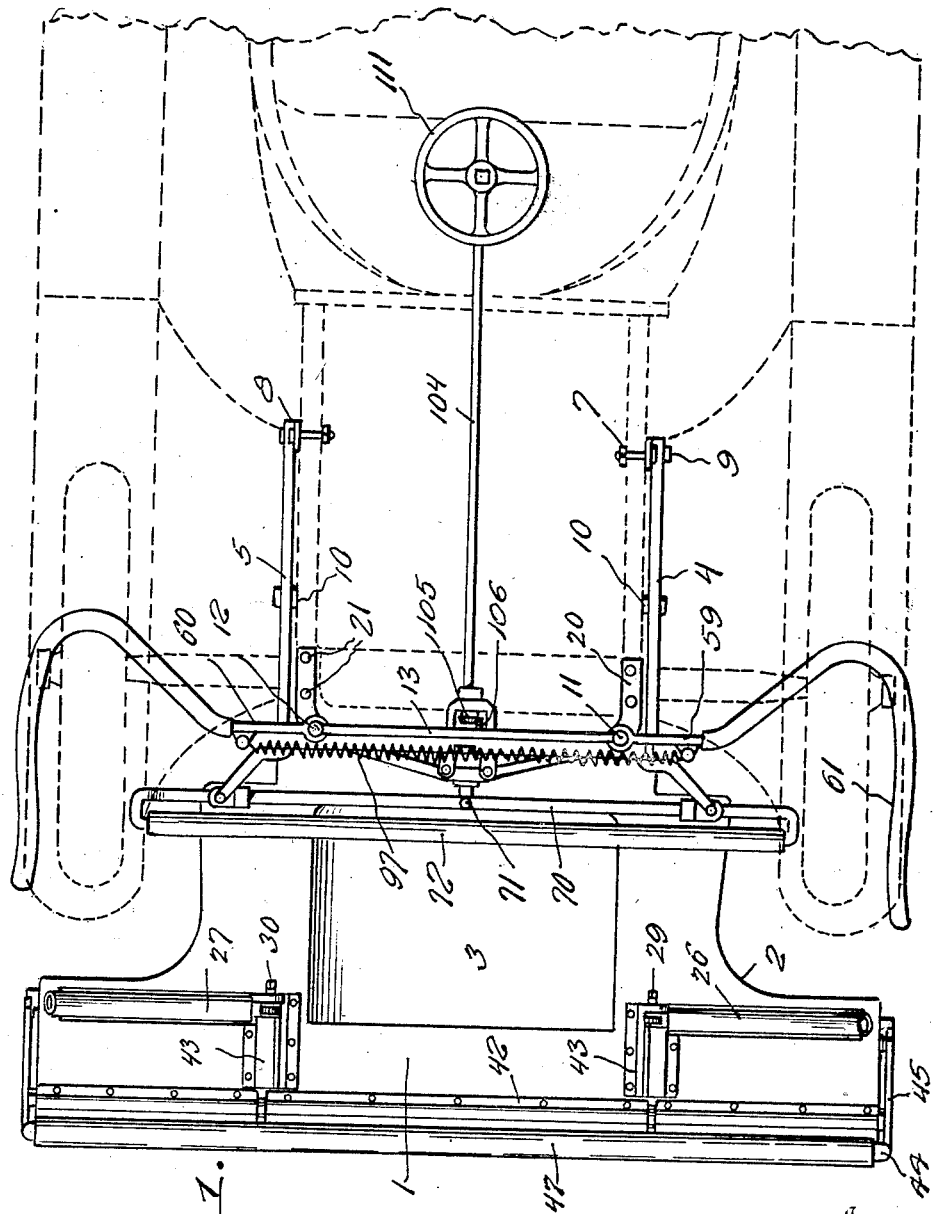

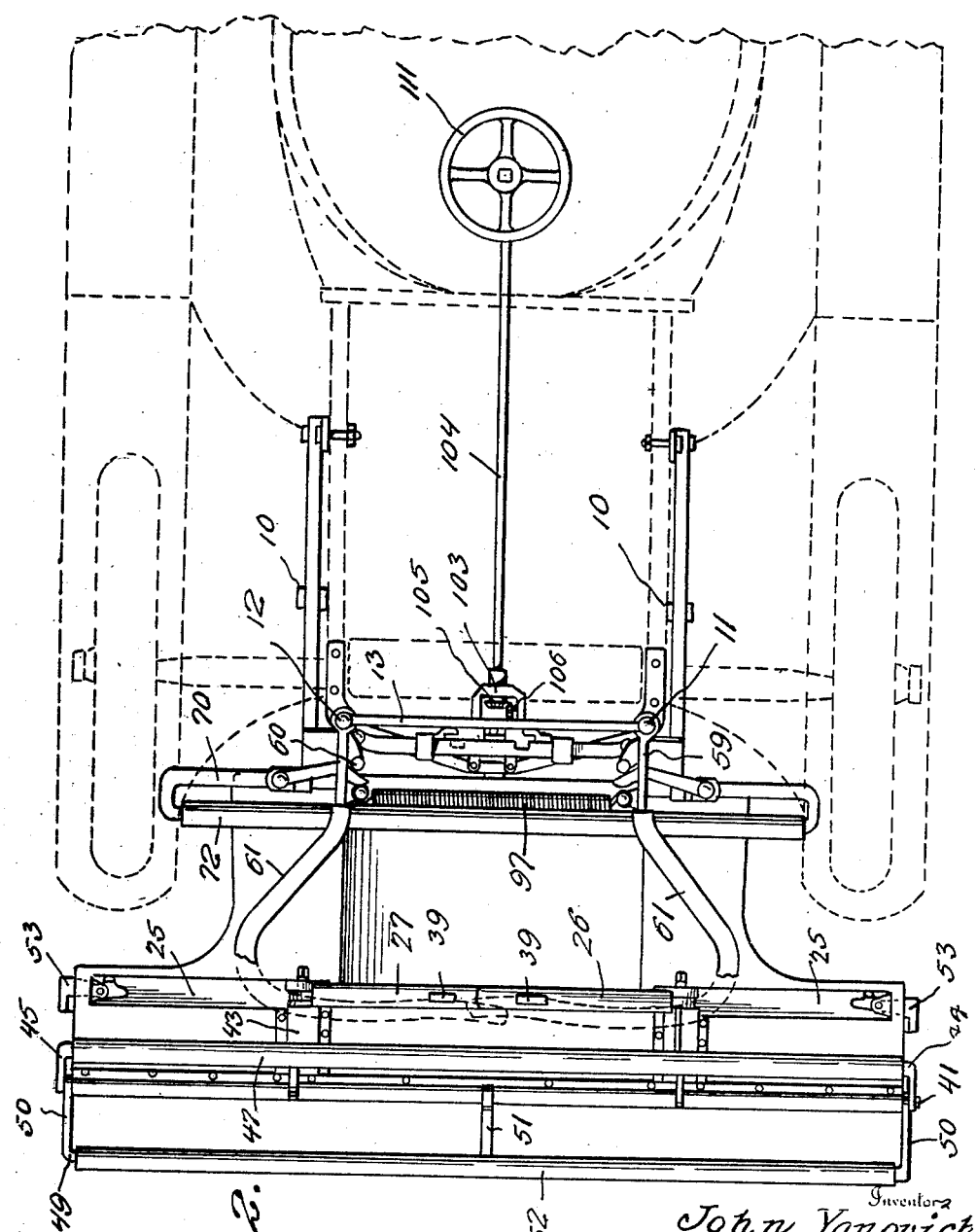

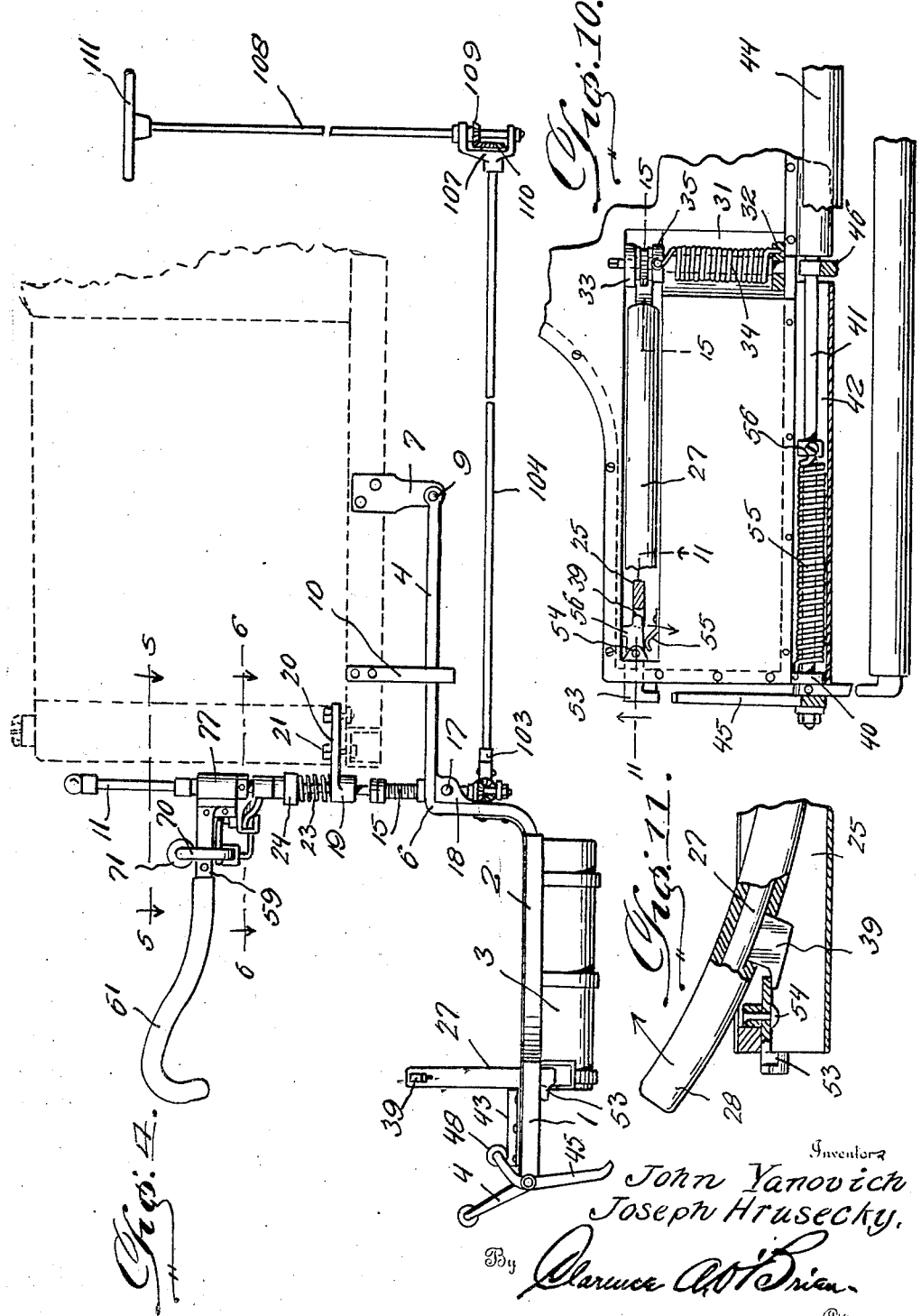

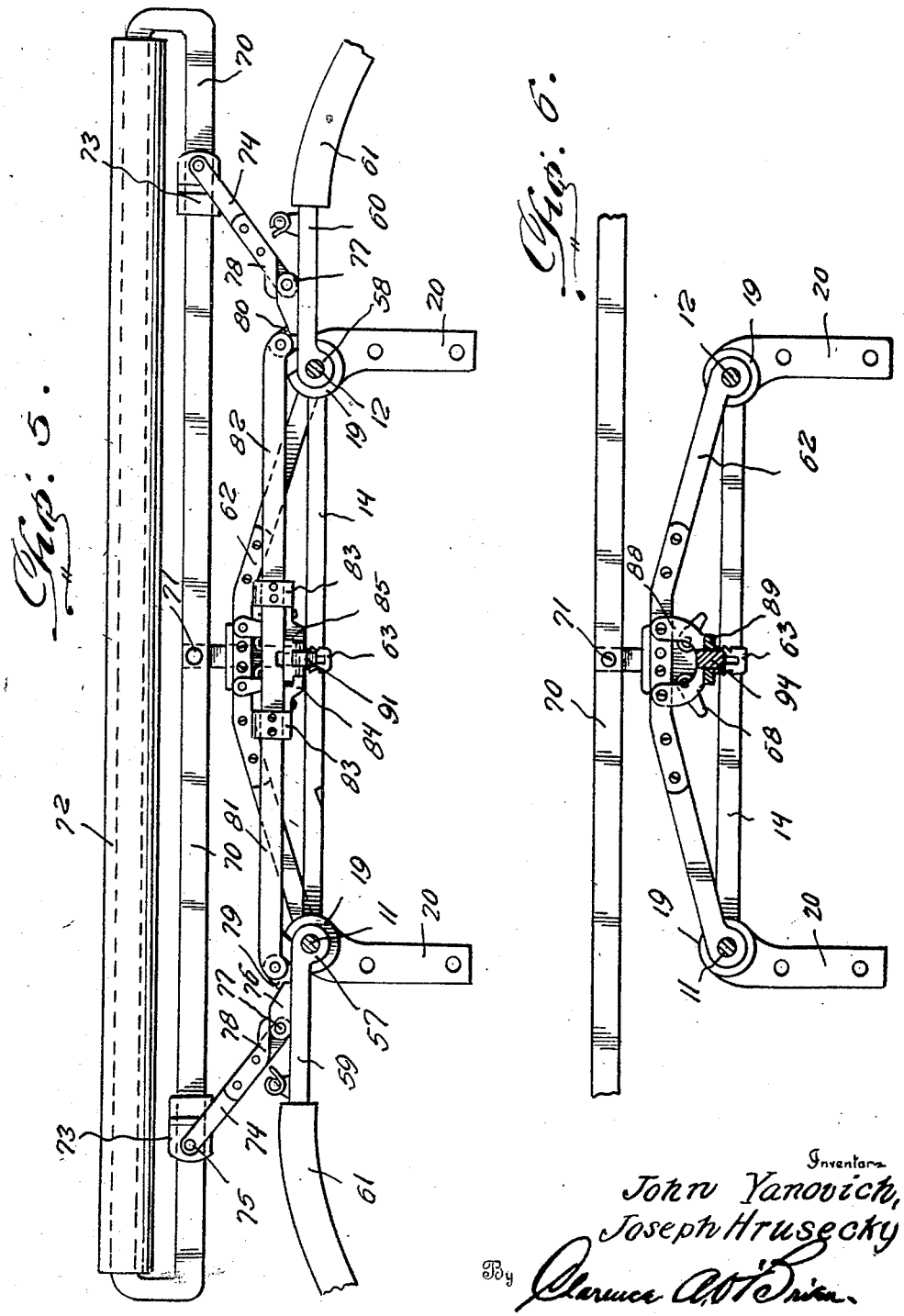

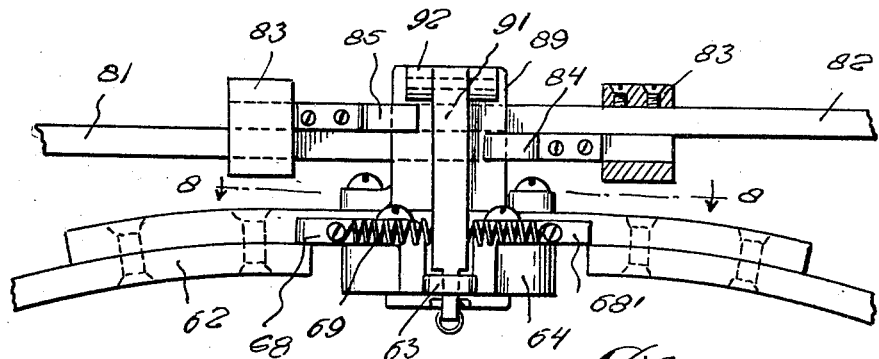
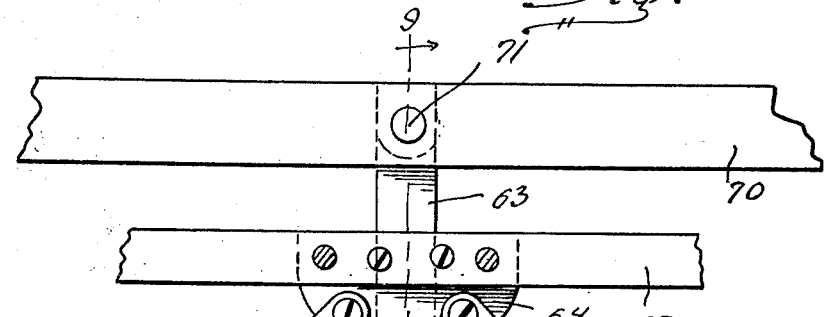
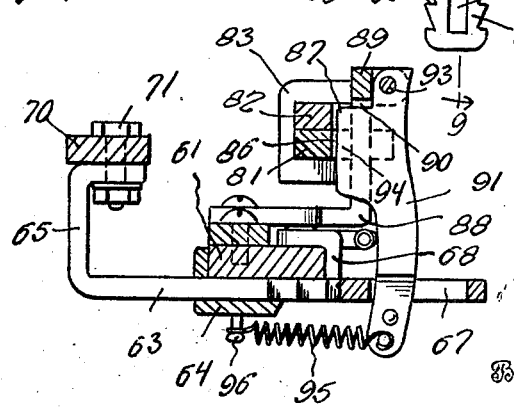
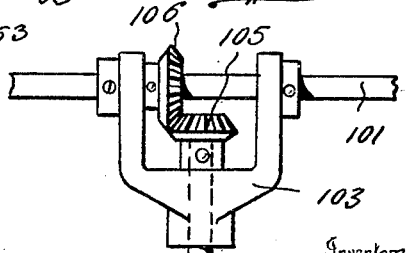

Patented Feb. 16, 1926.

1,573,471

UNITED STATES PATENT OFFICE.

JOHN YANOVICH AND JOSEPH HRUSECKÝ, OF ZELIENOPLE, PENNSYLVANIA.

SAFETY FENDER FOR MOTOR VEHICLES.

Application filed August 11, 1925. Serial No. 49,542.

*To all whom it may concern:*

Be it known that we, JOHN YANOVICH and JOSEPH HRUSECKÝ, citizens of the United States of America, residing at Zelienople, in the county of Butler and State of Pennsylvania, have invented a certain new and useful Improvement in a Safety Fender for Motor Vehicles, of which the following is the specification.

This invention relates to improvements in safety fenders for use upon automobiles, and has for its principal object to provide one which may be readily and easily attached to the front of a motor vehicle or the like, which will at all times be positive and efficient in carrying out the purposes for which it is designed, the device being further of such a nature as to prevent any possibility of a person coming in contact with the path of travel of the vehicle being run over by the front wheels of the vehicle and causing serious injury.

One of the important objects is to provide a safety fender which includes a platform, the latter being supported on the front of a vehicle, means being associated with the platform for automatically throwing the person's feet upwardly so as to cause the person to be thrown onto the platform and out of the path of the wheels of the vehicle should a person accidentally walk into the path of movement of the vehicle.

A further object is to provide a safety fender of the above mentioned character wherein additional means is provided on the platform for encircling the body of the person thrown thereon so as to hold the person on the platform while the vehicle is in motion thereby preventing the person who has been struck from being thrown on either side of the platform and into contact with the wheels.

A still further object is to provide a safety fender which includes two pairs of coacting arms, one pair being adapted to encircle the lower portion of the body of the person who has been thrown onto the platform, the other pair of arms being adapted to encircle the upper portion of the body, for holding the person on the platform in a safe manner, suitable protecting means being associated with each of the arms whereby the same will not injure the body of the person when thrown to an operative position.

A still further object is to provide a safety fender of the above mentioned character wherein means is provided for automatically tripping the pairs of coacting arms, said means being operated by the impact of the person struck by the platform.

A further object is to provide a safety fender wherein means is provided for raising and lowering the platform to any desired height, said means being controlled from the front seat of the automobile, thus obviating the necessity of the person having to leave the vehicle in order to properly adjust the height of the fender.

A still further object is to provide a safety fender which is simple in construction, inexpensive, strong, and durable and further well adapted to the purpose for which it is designed.

Other objects and advantages of the invention will become apparent during the course of the following description taken in connection with the accompanying drawings.

In the accompanying drawings forming a part of this application and in which like numerals designate like parts throughout the same:

Figure 1 is a top plan view of the safety fender embodying our invention showing the manner in which the same is mounted on the front of the motor vehicle, the fender being shown in a set position.

Figure 2 is a similar view, showing the fender in its tripped position.

Figure 3 is a front elevation of the platform, the lower pair of coacting arms being shown in a tripped position, the upper pair of coacting arms being shown in a set position.

Figure 4 is a side elevation of our improved safety fender, the parts being shown in a tripped position, and also illustrating the means for raising and lowering the platform.

Figure 5 is a sectional view taken approximately on line 5—5 of Figure 4 looking in the direction of the arrow.

Figure 6 is a similar section taken on line 6—6 of Figure 4.

Figure 7 is an enlarged fragmentary detail of the locking device for the upper pair of coacting arms.

Figure 8 is a sectional view taken approximately on line 8—8 of Figure 7, illustrating the ratchet member and the locking dogs associated therewith.

Figure 9 is a sectional view taken approximately on line 9—9 of Figure 8.

Figure 10 is an enlarged fragmentary top plan view, with parts shown in section of one end of the platform showing one of the lower arms, and the mechanism for actuating and tripping the same.

Figure 11 is a fragmentary sectional view taken on line 11—11 of Figure 10.

Figure 12 is a detail side elevation of the lever associated with a rearwardly swinging impact member, and showing the manner in which the foot engaging member is held in a locked position.

Figure 13 is a detail sectional view of the lower end of one of the standards showing the connection between the same and the platform supporting arm, and the means for actuating the standards.

Figure 14 is a detail of the yoke supported on the forward end of the elongated rod showing the connection between the rod and the transversely extending shaft for actuating the latter, and Figure 15 is a sectional view taken approximately on line 15—15 of Figure 10.

In the drawings wherein for the purpose of illustration is shown the preferred embodiment of our invention, the numeral 1 designates the platform, the rear portion thereof being cut away at its respective ends as illustrated at 2 so as to accommodate the front wheel of a motor vehicle, on the front of which the safety fender is to be attached, a depression or pocket 13 is formed in the central portion of the platform as clearly illustrated in Figures 1 and 4, and the purpose thereof will hereinafter be more fully described.

The attaching means for the safety fender comprises a pair of elongated arms, designated by the reference numerals 4 and 5 respectively, the same being bent downwardly adjacent the forward ends thereof as at 6. The forward ends of these arms are thence disposed forwardly and are secured to the bottom of the rear portion of the platform adjacent the respective ends thereof in any suitable manner. The rear ends of these supporting arms are pivotally secured to the lower ends of a suitable pair of brackets designated at 7 and 8 respectively, the latter being bolted or otherwise fastened to the respective sides of the chassis of the motor vehicle. The pivotal connection between the rear end of each arm and its respective bracket is indicated at 9. In this manner, the platform is adapted for vertical swinging movement for the purpose to be presently apparent. The downward swinging movement of the supporting arms and the fenders is limited through the medium of the hangers 10, the latter being secured at their upper ends to the respective sides of the chassis of the automobile at a point forwardly of the supporting brackets 7 and 8.

For the purpose of supporting the forward end portions of the arms in a substantially horizontal position, there is provided a pair of vertical standards 11 and 12 respectively. Suitable braces 13 extend transversely between the upper portions of these standards, and a similar brace 14 is disposed between the lower portions of the standards whereby said standards are maintained in their proper spaced parallel relation. The lower portions of the standards are threaded as indicated at 15 and arranged on each of the lower threaded ends of the standards is the threaded sleeve 16, a laterally extending pin 17 is formed on the lower portion of each of the sleeves, and these pins extending through suitable bearings 18, provided therefor at the bends 6 of the respective supporting arms so that a positive connection between the lower ends of the standards and the supporting arms is provided.

A pair of collars such as are shown at 19 are loosely supported on the intermediate portions of the standards and each of these collars is provided with a lateral extension 20 in its upper portion. Each of the lateral extensions is bolted, or otherwise secured to the top of the respective sides of the chassis of the automobile, as shown at 21 in Figures 1 and 4 of the drawings. The collars are of such construction as to permit the standards which are in the form of rods to slide freely therethrough when the carriage or platform is raised or lowered. Suitable stop collars 22 are also carried by the respective standards, and these stop collars limit the downward sliding movement of the lower brace 14, as is clearly illustrated in Figure 3 of the drawings.

The standards are maintained in a lowermost vertically movable position by the coil springs 23 which encircle the respective standards, and which are furthermore disposed between the collars 19, and the adjustable collars 24 which are also slidable on the respective standards, and are adapted to be secured in any desired adjusted position thereon.

The means provided for raising and lowering the platform by swinging the forward ends of the supporting arms upwardly, as well as also effecting the upwardly sliding movement of the standards through the guide collars 19 will be hereinafter more fully described.

Formed in the upper portion of the platform 1 adjacent the cut away portions 2, are the longitudinally extending pockets of channels 25. These channels are provided for receiving the curved spring arms 26 and 27 respectively, the same being adapted to cooperate in encircling the lower portion of the body of the person when struck by the impact receiving member, the construction of which is to be presently described. Each of these arms is covered with a protector casing of rubber, or the like, illustrated at 28, although it is to be understood that I do not wish to limit myself to the particular construction of the arms or the material used in conjunction therewith for preventing the same injuring the person when the arms are swung to an operative position. The inner ends of these arms are supported on the rear ends of the transversely extending shafts 29 and 30 respectively. These shafts are arranged in transversely extending depressions 31 provided therefor in the platform 1, and the transversely extending depressions communicate with the inner ends of the longitudinally extending channels 25, as clearly shown in Figure 10. The forward end of each of these shafts is journaled in a suitable bearing 32 provided therefor in the forward end of the respective depressions, and the rear end of each of the said transversely extending shafts is journaled in a similar bearing 33 which is arranged in the rear portion of the transversely extending depressions or channels. A coil spring 34 encircles each of the transversely extending shafts, one end of the coil spring being secured to the forward bearing 32, and at its opposite end suitable collar 35 which is secured on the rear portion of each of the transversely extending shafts. This construction is clearly illustrated in Figure 10.

A ratchet wheel 36 is secured on the rear end of each of the transversely extending shafts, and a spring urged pawl 37 extends outwardly from the inner end of each of the curved arms for cooperation with the respective ratchet wheels in the manner shown in Figure 15. The inner end of each of the arms is bifurcated as illustrated at 38, and the furcations of each arm are disposed on opposite sides of the ratchet wheel on the rear end of the respective shafts 29 and 30.

A lug, such as is shown at 39 extends outwardly from each of the arms adjacent the outer free ends thereof, and these lugs project beyond the protector tubing, or casing 28, as shown in Figure 11. The purpose of these lugs will also hereinafter be more fully described.

Extending longitudinally through the forward end of the platform 1, and journaled at its respective ends in suitable bearings such as are shown at 40 is the shaft 41. The ends of this shaft project beyond the respective sides or ends of the platform, a suitable casing or housing 42 being provided for the shaft. Similar casings or housing 43 extend over the depressions or channels 31 in which are mounted the transversely extending shafts 29 and 30. An elongated rod 44 has its respective ends disposed rearwardly as illustrated at 45, and the latter are secured on the respective ends of the longitudinally extending shaft 41 as shown in Figure 10. Auxiliary bracing members 46 extend from the intermediate portion of the shaft 41 through the casing 42 and are secured at their forward ends to the intermediate portions of the rods 44. A rubber protector sleeve 47, Fig. 12, similar to the rubber protecting sleeve 28 is disposed over the rod 44. This rod 44 comprises what I term as a means for receiving the impact when a person strikes the same should the person accidentally come into the path in the direction in which the vehicle is traveling.

As is shown more clearly in Figure 12, the rearwardly extending arms 45 formed at the respective ends of the longitudinally extending rod 44 are supported intermediate their ends on the respective ends of the shaft, the free ends of these end portions being disposed slightly upwardly and providing the cam faces 48, the purpose of which will also be presently apparent.

A foot engaging member designated generally by the numeral 49 Fig. 2 is also in the form of an elongated rod, the end portions of which are disposed rearwardly, as at 50, and are pivotally supported on the respective ends of the longitudinally extending shaft 41. An intermediate brace 51 extends transversely between the intermediate portion of the shaft 41 and the intermediate portion of the rod 49, the latter being also covered by the rubber protecting casing shown at 52.

For the purpose of normally holding the foot engaging member in a set position whereby the same will be disposed beneath a forward portion of the platform, in the outer end of each of the longitudinally extending pockets or cavity 25, is the pivoted latch 53, Fig. 10, the same being pivotally supported intermediate its ends as at 54, the outer end of each latch projecting beyond the respective ends of the platform, and the inner ends of these latches are adapted to cooperate with the lugs 39, formed on the respective arms 26 and 27 for holding the latter in an open and set position whereby said arms will be disposed within their respective pockets. These latches swing to a horizontal plane, and the outwardly disposed portions thereof engage the end portions 50 of the foot engaging rod 49, and support the latter against the bottom of the forward portion of the platform as shown more clearly in Figure 12. When the parts are arranged as above described, the cam faces 49 formed on the free ends of the end portions of the impact member 44 will be disposed above the outwardly disposed portions of the latches, and cooperate therewith in a manner to be presently described.

The safety fender as thus far described provides a device for catching small children who have come into the path of travel of the automobile, and it is obvious that when the impact member 44 is in the position shown in Figure 12, with the foot engaging member disposed beneath the platform, and the curved arms 26 and 27 swung outwardly to an open position, the child upon being struck by the impact member 44 will cause the latter to swing in a direction of the arrow and this movement will effect a downward swinging movement of the outer ends 45 whereupon the cam faces 48 will engage the outer ends of the latch members 53 and swing the same rearwardly in the direction of the arrows, and simultaneously releasing the foot engaging member which will swing outwardly and forwardly in the direction of the arrow, due to the tension of the coil spring 55 which encircles each end of the shaft 41 and is secured at its respective ends to a collar 56 which is secured on the shaft 41, the outer end of each spring being secured to the bearing 40 disposed in the end of the casing 42.

Simultaneous with the release of the foot engaging member, the inner ends of the latches will disengage from the lugs 39, and through the medium of the transversely extending shafts 29 and 30, the arms 26 and 27 respectively will swing upwardly and inwardly toward each other to cooperating relation. As the foot engaging member moves forwardly, the same will lift the child off of the ground, causing the child to be thrown onto the platform, and more particularly into the pocket or chamber 3, and if desired, the latter may be padded so as not to cause any injury to the child when thrown therein. As soon as the child has been thrown into the pocket or compartment 3, the curved spring arms 26 and 27 will have moved to their innermost positions so as to encircle the body portion of the child and prevent the child from moving on the platform and coming in contact with the front wheels of the vehicle. In this manner a child will be prevented from being seriously injured when struck by a vehicle upon which a safety fender of the character above described is attached, and the means for throwing the child onto the platform is entirely automatic, and does not necessitate the attention of the operator of the vehicle to actuate the same in case of an emergency. Of course, as soon as the vehicle has been brought to a stop, the arms 26 and 27 are swung outwardly to an open position to permit the child to be easily removed from the platform, and the members which have been tripped are again set in their normal positions.

A spring 55 is arranged in each of the channels 25 adjacent the outer end thereof and cooperates with the inner end of each latch 53 in maintaining the same in its proper position. A projection 56 is formed on the rear face of the inner end portion of each latch for limiting the rearward swinging movement of the inner end of each latch. This construction is also clearly illustrated in Figure 10 of the drawings.

Slidable on the upper portions of the standards 11 and 12, and adapted to be adjustably secured thereon in any desired height are the sleeves 57 and 58 Fig. 3 respectively. These sleeves are adapted to rotate on their respective standards and carried by these rotatable sleeves are the coacting curved arms 59 and 60, the latter being also covered with a suitable protector casing or tubing of rubber, as shown at 61, Fig. 4. The purpose of these arms will be hereinafter more fully described.

Extending transversely between the intermediate portions of the standards and at a point below the rotatable sleeve is the cross bar 62, Figs. 8 and 9. A ratchet member 63 is slidably supported in a suitable guide member 64 provided therefor on the under side of the intermediate portion of the cross bar 62, and the forward end of the ratchet member is bent upwardly as illustrated at 65. Ratchet teeth 66 are formed in the side edges of the rear portion of the member 63, and a longitudinally extending slot 67 is also formed in the rear portion of the ratchet member. The purpose of this construction will be hereinafter more fully described. Pivotally supported on the guide block 64 and disposed on opposite sides of the ratchet members 63, are the locking dogs 68 and 68' respectively, the same being adapted to cooperate with the ratchet teeth in locking the ratchet member against forward movement through the guide block 64. Suitable coil springs 69 are provided for normally holding the locking dogs in engagement with the ratchet teeth.

Pivotally supported intermediate its ends on the upper portion of the upwardly extending forward end 65 of the ratchet member 63 is the elongated bar 70, the pivot therefor being illustrated at 71. The end portions of the bar are disposed inwardly toward each other and are covered with the protector rubber casing 71, as is clearly illustrated in Figure 5. The bar 70 provides an impact receiving member which extends transversely across the upper portions of the standards in the manner as clearly illustrated in the drawings.

A pair of slide members 73 are arranged on the flat bar 70 and are adapted for longitudinal slidable movement thereon. A link 74 is pivotally secured at its forward end to each of the slide members, as illustrated at 75. The rear end of each of the links is pivotally secured to the lateral extensions 76 formed on each of the rotatable sleeves, the pivotal connection between the rear ends of the links and the respective lateral extensions is illustrated at 77. A stop member 78 is arranged on each of the links and cooperates with the forward face of the respective lateral extensions 76 for limiting the swinging movement of the upper impact receiving member or bar 70, as is obvious from the construction shown more clearly in Figure 5.

Extending forwardly from the rotatable sleeves 57 and 58 are the ears 79 and 80 respectively. A pair of superposed bars 81 and 82 are pivotally secured at their outer ends to the ears 79 and 80 respectively. These bars are adapted for slidable movement, and for the purpose of maintaining the same in proper vertical alignment, suitable guide sleeves 83 are supported on the inner opposed free ends of the bars, the free ends of one of the bars being adapted to extend through the sleeve carried by the free end of the other bar, and vice versa. Also arranged on the rear faces of the free ends of these slidable bars are the locking dogs 84 and 85 respectively. A notch 86 is formed in the rear edge of the bar 81 adjacent the free end thereof, and a similar notch 87 is formed in the rear edge of the other slidable bar 82. This construction is clearly illustrated in Figure 9.

An angular bracket 88 is secured on the top of the cross member 62, and the upwardly disposed portion 89 of said bracket extends vertically adjacent rear edges of the slidable bars 81 and 82. This upwardly disposed portion 89 of the angular bracket is provided with a vertical slot 90. A lever 91 is pivotally supported at its upper end on the rear face of the upwardly disposed portion 89, a pair of rearwardly extending ears 92 being arranged on the upper portion of the upwardly extending portion 89, between which is disposed the upper end of the lever, and through which extends the pivot pin 93. The lower portion of this lever extends through the longitudinally extending slot 67 formed in the rear portion of the ratchet member 63. A projection 94 is formed on the forward edge of the upper portion of this lever and provides a locking dog, the purpose of which will be presently apparent.

This locking dog 94 extends through the slot 90, and is adapted to be disposed with the notches 86 and 87 formed in the rear edges of the slidable bars 81 and 82 respectively when the notches are in vertical alignment for the purpose of locking the bars in their innermost position to hold the coacting curved arms 59 and 60, which are associated with the rotatable sleeves 57 and 58 respectively in an open set position. As is shown more clearly in Figure 9, a coil spring 95 is secured at one end to the lower free end of the lever 91, and at its opposite end to a pin 96 which projects downwardly from the guide block 64. This coil spring normally urges the lever forwardly so as to hold the locking dog 94 of the lever in its forwardmost position.

A coil spring 97 extends transversely between the rear portion of the coacting curved arms 59 and 60 and provides a means for normally holding the arms in their closed position.

When the coacting spring arms 59 and 60 are in an open set position, the slidable bars 81 and 82 will have their respective notches disposed in vertical alignment and the locking dog 94 will be disposed in the notches, thus preventing any possibility of the arms sliding outwardly. As soon as the impact receiving member which embodies the bar 71 is struck by a person who has been thrown onto the platform, the force will cause the ratchet member 63 to move rearwardly through the guide block 64 secured on the under side of the cross member 62, and as the ratchet member slides rearwardly, the forward edge of the slot 67 will engage the front edge of the lower portion of the lever 91, causing the lever to swing rearwardly on its pivot 93, and simultaneously moving the locking dog 94 outwardly of engagement with the notches 86 and 87 respectively, and as soon as this locking dog is free from engagement with the slidable bars 81 and 82, the coil springs 97 will automatically cause the rotatable sleeves 58 and 57 to rotate on their respective standards and to cause the curved arms 59 and 60 to swing inwardly, thereby to enclose the upper portion of the body of the person who has been thrown onto the platform, and subsequently striking the upper impact receiving member. In this manner, the upper pair of arms will tend to hold the victim on the platform until the vehicle has been brought to a stop, and the arms opened so as to permit the person to be removed from the platform.

In resetting the upper pair of arms, it is necessary to actuate the spring pressed pawls or dogs 68 so as to disengage the same from the ratchet teeth 66 and to permit the forward sliding movement of the ratchet member 63 to its normal position. As is shown in Figure 7, the dogs 84 and 85 will engage the rear face of the upwardly extending portion 89 of the angular bracket 88 when the bars 81 and 82 have their notches disposed in vertical alignment, and the locking dog 94 is also disposed in these registering notches.

For the purpose of raising and lowering the safety fender to various heights so that the platform may be held at any height with respect to the street or surface, there is provided on the lower portion of each of the standards, a bevel gear 98. This bevel gear is secured on each of the standards adjacent the lower end thereof, and at a point directly below the threaded portion of each standard. A yoke 99 Fig. 13 has its arms provided with registering openings through which the lower end of each of the standards extends, a suitable nut, or the like, shown at 100 being threaded on the lower end of each standard for securing the yoke 99 thereon. The transversely extending shaft 101 has its end portion extending through the inner opposed ends of the yokes 99, and on each end of this shaft is a bevel gear 102 which meshes with the bevel gear 98 carried by the lower end of each of the standards. An additional yoke 103 Fig. 2 has its arms provided with registering openings through which the transverse shaft 101 extends, and this yoke 103 is preferably located at the intermediate portion of the transverse shaft.

An elongated shaft 104 which extends longitudinally beneath the vehicle has its forward end extending into said yoke and carries thereon the bevel gear 105 which meshes with a bevel gear 106 secured on the intermediate portion of the transverse shaft 101 in the manner shown more clearly in Figure 2 of the drawing. The rear end of the longitudinally extending shaft 104 has supported thereon the yoke 107, and extending through suitable registering openings provided in the arms of the yoke is the lower end of the vertical shaft 108, the same extending upwardly through the floor board of the vehicle adjacent the front seat thereof. A bevel gear 109 is secured on the lower portion of the vertical shaft 108 and meshes with a suitable bevel gear 110 carried by the rear end of the longitudinally extending shaft 104. An actuating handle 111 is attached to the upper end of the vertical shaft 108, and is disposed within easy access of the occupant of the front seat.

It it obvious that when the handle 111 is turned in one direction, the shafts 108, 104, and 101 respectively will be rotated through the medium of the intermeshing bevel gearing, and as a result, the standards 11 and 12, whose lower portions are threaded will be caused to be raised vertically through the medium of the internally threaded sleeve 16, and as the latter are connected to the forward end portions of the arms 4 and 5, the latter will swing upwardly on their pivots 9. In this manner, the safety fender may be held in any desired vertically adjusted position, so that the bottom of the fender will not drag on the ground, and may be free to pass over the uneven portions in a road or highway.

It will thus be seen from the foregoing description that a safety fender has been provided which may be readily and easily attached to a vehicle, such as an automobile, street car, or the like. The device being at all times positive and efficient in its operation as well as automatic. The simplicity in which our improved safety fender is constructed enables the parts to be readily set after they have been tripped, and furthermore the fender will in no way interfere with the operation of the vehicle upon which the same is attached.

While we have shown the preferred embodiment of our invention it is to be understood that minor changes in the size, shape, and arrangement of parts may be resorted to without departing from the spirit of the invention and the scope of the appended claims.

Having thus described the invention, what we claim is:—

1. A safety fender for vehicles comprising a platform adapted to be supported on the front of a vehicle, an impact receiving member arranged on the forward end of the platform, and a foot engaging member adapted to be automatically actuated when a person is struck by the impact member for throwing the person onto the platform.

2. A safety fender for vehicles comprising a platform adapted to be supported on the front of a vehicle, an impact receiving member arranged on the forward end of the platform, and a foot engaging member adapted to be automatically actuated when a person is struck by the impact member for throwing the person onto the platform, and means for holding the person on the platform.

3. A safety fender for vehicles comprising a platform adapted to be supported on the front of a vehicle, an impact receiving member arranged on the forward end of the platform, and a foot engaging member adapted to be automatically actuated when a person is struck by the impact member for throwing the person onto the platform, and a pair of coacting body encircling members arranged on the platform.

4. A safety fender for vehicles comprising a platform adapted to be supported on the front of a vehicle, an impact receiving member arranged on the forward end of the platform, and a foot engaging member adapted to be automatically actuated when a person is struck by the impact member for throwing the person onto the platform, and a pair of coacting body encircling members arranged on the platform, and means operable by said impact receiving member for automatically moving the body encircling arms to an operative position.

5. A safety fender for vehicles comprising a platform, means for supporting the same on the front of a vehicle, an impact receiving member arranged on the platform, a pair of body encircling arms on the platform, and means operable by the impact receiving member for automatically actuating the body encircling arms.

6. A safety fender for vehicles comprising a platform, means for supporting the same on the front of a vehicle, a pair of standards extending upwardly from the rear portion of the platform, an impact receiving member at the forward end of the platform, an additional impact receiving member extending across the upper portions of the fenders, a pair of coacting arms mounted on said platform and adapted to encircle the lower portion of the body of a person when struck by the first mentioned impact receiving member and thrown onto said platform, and an additional pair of coacting arms mounted on the standards and adapted to automatically be moved into an operative position to encircle the upper portion of the body when the second mentioned impact receiving member is engaged by a person.

7. A safety fender for vehicles comprising a platform adapted to be supported on the front of a vehicle, an impact receiving member arranged on the forward end of the platform, a foot engaging member supported on the forward end of the platform, means for normally holding said foot engaging member beneath the forward portion of the platform, and means associated with the impact receiving member for releasing said locking means whereby the foot engaging member is automatically swung to an operative position for assisting in throwing the person struck by the impact receiving member onto said platform.

8. A safety fender for vehicles comprising a platform adapted to be supported on the front of a vehicle, an impact receiving member arranged on the forward end of the platform, a foot engaging member supported on the forward end of the platform, means for normally holding said foot engaging member beneath the forward portion of the platform, and means associated with the impact receiving member for releasing said locking means whereby the foot engaging member is automatically swung to an operative position for assisting in throwing the person struck by the impact receiving member onto said platform, and a pair of coacting body encircling arms mounted on the platform adapted to be automatically actuated simultaneous with the release of said foot engaging member.

9. A safety fender for vehicles comprising a platform adapted to be supported on the front of a vehicle, an impact receiving member aranged on the forward end of the platform, a foot engaging member supported on the front of the platform, a pair of coacting body encircling arms pivotally supported at their outer ends on the platform, a latch for normally holding the free end of each of said arms and a free portion of the foot engaging member in a set position, and means associated with the impact receiving member for releasing said latch mechanism when a person is struck by the impact receiving member whereby the foot engaging member is automatically swung from beneath the platform to assist in throwing the person struck by the impact receiving member onto the platform simultaneously causing the arms to swing inwardly over the body of the person.

10. In a safety fender for vehicles, of means for supporting the same on the front of a vehicle, said means comprising a pair of arms attached at their forward ends to the fender, means for pivotally supporting the rear ends of the arms on the respective sides of the chassis of the vehicle, means for limiting the downward swinging movement of the arms and the fenders, and an additional means for vertically adjusting the fender.

11. In a safety fender for vehicles wherein the same includes a platform, and a pair of vertical standards associated with the rear of the platform, of means for supporting the fender on the front of a vehicle, said means comprising a pair of arms secured at their forward ends to the rear portion of the platform, the rear ends of said arms being pivotally attached to the respective sides of the chassis of the vehicle, guide collars mounted on the standards and secured to the forward end of the chassis, means for limiting the downward swinging movement of the arms, means for connecting the standards to the respective arms, an additional means for facilitating the raising and lowering of the arms.

12. A safety fender for vehicles comprising a platform, means for supporting the same on the front of a vehicle, a shaft extending longitudinally in the forward portion of the platform, an impact receiving member arranged on the forward end of the platform, the ends of said impact receiving member being disposed rearwardly and supported intermediate the ends thereof on the respective ends of the shaft, a foot engaging member supported on the respective ends of the shaft and adapted to swing underneath of the forward portion of the platform, and a pair of latch members arranged on the platform, and cooperating with the free end of the foot engaging member for holding the same in a set position beneath the platform.

13. A safety fender for vehicles comprising a platform, means for supporting the same on the front of a vehicle, a shaft extending longitudinally in the forward portion of the platform, an impact receiving member arranged on the forward end of the platform, the ends of said impact receiving member being disposed rearwardly and supported intermediate the ends thereof on the respective ends of the shaft, a foot engaging member supported on the respective ends of the shaft and adapted to swing underneath of the forward portion of the platform, and a pair of latch members arranged on the platform, and cooperating with the free end of the foot engaging member for holding the same in a set position beneath the platform, and means associated with the free ends of said impact receiving member for tripping said latch member when a person strikes said impact receiving member for automatically swinging the foot engaging member forwardly to assist in throwing the person onto the platform.

14. A safety fender for vehicle comprising a platform, means for supporting the same on the front of a vehicle, a shaft extending longitudinally in the forward portion of the platform, an impact receiving member arranged on the forward end of the platform, the ends of said impact receiving member being disposed rearwardly and supported intermediate the ends thereon on the respective ends of the shaft, a foot engaging member supported on the respective ends of the shaft and adapted to swing underneath of the forward portion of the platform, and a pair of latch members arranged on the platform, and cooperating with the free end of the foot engaging member for holding the same in a set position beneath the platform, and a pair of coacting body encircling arms pivotally supported at their inner ends on the platform, means being associated with the outer free ends of the arms for cooperation with the latch members whereby the arms are held in a set position.

15. A safety fender for vehicles comprising a platform, means for supporting the same on the front of a vehicle, a shaft extending longitudinally in the forward portion of the platform, an impact receiving member arranged on the forward end of the platform, the ends of said impact receiving member being disposed rearwardly and supported intermediate the ends thereon on the respective ends of the shaft, a foot engaging member supported on the respective ends of the shaft and adapted to swing underneath of the forward portion of the platform, and a pair of latch members arranged on the platform, and cooperating with the free end of the foot engaging member for holding the same in a set position beneath the platform, and a pair of coacting body encircling arms pivotally supported at their inner ends on the platform, means being associated with the outer free ends of the arms for cooperation with the latch members whereby the arms are held in a set position, and means associated with the free ends of the impact receiving member for releasing the latch members when a person is struck by the impact receiving member whereby said foot engaging member and said coacting body encircling arms are swung to an operative position.

16. A safety fender for vehicles comprising a platform, means for supporting the same on the front of the vehicle, a pair of vertical standards extending upwardly from the rear portion of the platform, an impact receiving member extending transversely across the standards, a pair of coacting body encircling arms rotatably mounted at the inner ends of the respective standards, means associated with said arms, and said impact receiving member for holding the arms in open set position, and means for automatically swinging said arms inwardly to a closed position when the impact receiving member is struck.

17. A safety fender for vehicles comprising a platform, means for supporting the same on the front of a vehicle, a pair of vertical standards extending upwardly from the rear portion of the platform, a pair of coacting body encircling arms rotatably mounted at the inner ends on the respective standards, an impact receiving member extending transversely across the front of the standards, a pair of slidable bars connected at their outer ends to the respective arms at the inner ends thereof, said bars being disposed in superposed relation and provided with notches in the rear edges thereof, said notches being disposed in registry with each other when the arms are swung outwardly to an open position, and means associated with the standards for engagement with the registering notches for holding the arms in their open set position, and means operable by said impact receiving member for releasing said aforementioned means to permit the arms to swing inwardly to a closed position.

18. A safety fender for vehicles comprising a platform, means for supporting the same on the front of the vehicle, a pair of vertical standards extending upwardly from the rear portion of the platform, an impact receiving member extending transversely across the front of the standards, a pair of coacting body encircling arms rotatably supported on the respective standards, a pair of superposed slidable bars secured at their outer ends to the inner ends of the respective arms, said bars being provided with notches in the rear edges thereof adapted to register with each other when the arms are swung to an open position, a lever, a locking dog associated with said lever and adapted to fit in said registering notches for holding the bars against sliding movement whereby the arms are held in a set position, and means associated with the impact receiving member for actuating said lever to release the dog from the notches, and additional means for automatically swinging the arms inwardly to a closed position when said locking dog is released.

19. A safety fender for vehicles comprising a platform, means for supporting the same on the front of the vehicle, a pair of vertical standards extending upwardly from the rear portion of the platform, an impact receiving member extending transversely across the front of the standards, a pair of coacting body encircling arms rotatably supported on the respective standards, a pair of superposed slidable bars secured at their outer ends to the inner ends of the respective arms, said bars being provided with notches in the rear edges thereof adapted to register with each other when the arms are swung to an open position, a lever, a locking dog associated with said lever and adapted to fit in said registering notches for holding the bars against sliding movement whereby the arms are held in a set position, and means associated with the impact receiving member for actuating said lever to release the dog from the notches, and additional means for automatically swinging the arms inwardly to a closed position when said locking dog is released, said last mentioned means comprising a coil spring secured at its respective ends to the inner end portions of said arms.

In testimony whereof we affix our signatures.

JOSEPH HRUSECKÝ.
JOHN YANOVICH.